US 7,904,894 B2

(12) United States Patent
Entin et al.

(10) Patent No.: US 7,904,894 B2
(45) Date of Patent: Mar. 8, 2011

(54) AUTOMATICALLY OPTIMIZE PERFORMANCE OF PACKAGE EXECUTION

(75) Inventors: Michael Entin, Redmond, WA (US); Euan P. Garden, Bellevue, WA (US); J. Kirk Haselden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1219 days.

(21) Appl. No.: 11/392,342

(22) Filed: Mar. 29, 2006

(65) Prior Publication Data

US 2007/0234240 A1 Oct. 4, 2007

(51) Int. Cl.
*G06F 9/45* (2006.01)

(52) U.S. Cl. ......... 717/151; 717/130; 717/131; 717/127; 718/102; 718/103

(58) Field of Classification Search .......... 717/126–128, 717/130–131, 151; 718/102, 103, 106
See application file for complete search history.

(56) References Cited

U.S. PATENT DOCUMENTS

| | | | | |
|---|---|---|---|---|
| 6,018,759 | A * | 1/2000 | Doing et al. ................ | 718/108 |
| 6,314,562 | B1 * | 11/2001 | Biggerstaff ................ | 717/156 |
| 6,424,948 | B1 | 7/2002 | Dong et al. | |
| 6,631,518 | B1 * | 10/2003 | Bortnikov et al. ........... | 717/158 |
| 6,671,876 | B1 * | 12/2003 | Podowski ................. | 717/130 |
| 6,748,555 | B1 * | 6/2004 | Teegan et al. ................ | 714/38 |
| 6,832,201 | B1 | 12/2004 | Leymann et al. | |
| 6,859,893 | B2 | 2/2005 | Hines | |
| 6,971,091 | B1 | 11/2005 | Arnold et al. | |
| 6,983,227 | B1 * | 1/2006 | Thalhammer-Reyero ........ | 703/2 |
| 7,086,035 | B1 * | 8/2006 | Mericas ................ | 717/127 |
| 7,139,779 | B1 * | 11/2006 | Kornelson et al. ................ | 1/1 |
| 7,174,534 | B2 * | 2/2007 | Chong et al. ................ | 717/105 |
| 7,565,304 | B2 * | 7/2009 | Casati et al. ................ | 705/7 |
| 2002/0091560 | A1 | 7/2002 | Suzuki et al. | |
| 2002/0144233 | A1 * | 10/2002 | Chong et al. ................ | 717/105 |
| 2002/0147969 | A1 * | 10/2002 | Lethin et al. ................ | 717/138 |
| 2002/0178077 | A1 * | 11/2002 | Katz et al. ................ | 705/26 |
| 2003/0229524 | A1 | 12/2003 | Reuveni | |
| 2003/0236677 | A1 * | 12/2003 | Casati et al. ................ | 705/1 |
| 2003/0236691 | A1 * | 12/2003 | Casatl et al. ................ | 705/8 |
| 2004/0078780 | A1 * | 4/2004 | Dutt et al. ................ | 717/106 |
| 2004/0172585 | A1 | 9/2004 | Nelson | |
| 2004/0186915 | A1 * | 9/2004 | Blaszczak et al. ........... | 709/246 |
| 2004/0249644 | A1 * | 12/2004 | Schiefer et al. ................ | 705/1 |
| 2005/0071350 | A1 | 3/2005 | Artale et al. | |
| 2005/0096950 | A1 * | 5/2005 | Caplan et al. ................ | 705/7 |
| 2005/0132167 | A1 * | 6/2005 | Longobardi ................ | 712/201 |
| 2005/0154861 | A1 | 7/2005 | Arimilli et al. | |

(Continued)

OTHER PUBLICATIONS

Title: A General Compiler Framework for Speculative Optimization Using Data Speculative Code Motion, author: Dai et al, source: IEEE, Dated: Mar. 23, 2005.*

(Continued)

*Primary Examiner* — Chameli C Das

(57) ABSTRACT

Various technologies and techniques are disclosed that automatically optimize package execution performance. A profiling phase executes each task in a control flow package and measures performance metrics, such as task execution length, task memory usage, task correlation to CPU versus input/output operations, network bandwidth, and running applications. An optimization phase optimizes subsequent executions of the package by using the performance metrics to make appropriate adjustments to the package. The profiling phase and optimizing phase are repeated over a period of time as appropriate to improve the package's performance without requiring a user to make adjustments to the tasks in the package.

20 Claims, 6 Drawing Sheets

U.S. PATENT DOCUMENTS

| | | | |
|---|---|---|---|
| 2005/0155019 A1* | 7/2005 | Levine et al. | 717/127 |
| 2005/0155022 A1* | 7/2005 | DeWitt et al. | 717/131 |
| 2005/0171930 A1 | 8/2005 | Arning et al. | |
| 2005/0172278 A1 | 8/2005 | Kuch et al. | |
| 2005/0187991 A1* | 8/2005 | Wilms et al. | 707/204 |
| 2005/0204349 A1 | 9/2005 | Lewis et al. | |
| 2005/0283786 A1 | 12/2005 | Dettinger et al. | |
| 2006/0059474 A1* | 3/2006 | Bhansali et al. | 717/151 |
| 2006/0229896 A1* | 10/2006 | Rosen et al. | 705/1 |
| 2006/0248317 A1* | 11/2006 | Vorbach et al. | 712/221 |
| 2006/0253311 A1* | 11/2006 | Yin et al. | 705/8 |
| 2007/0157178 A1* | 7/2007 | Kogan et al. | 717/130 |
| 2007/0240112 A1* | 10/2007 | Haselden et al. | 717/121 |
| 2008/0189687 A1* | 8/2008 | Levine et al. | 717/128 |
| 2008/0250057 A1* | 10/2008 | Rothstein et al. | 707/102 |

OTHER PUBLICATIONS

Title: Task Execution Time Modeling for Heterogeneous Computing Systems, author: Ali et al, source: IEEE, DatedL Aug. 6, 2002.*

Vieira, et al., "An Ontology-drive Architecture for Flexible Workflow Execution", ISBN:0-7695-2237-8, Proceedings of the WebMedia & LA-Web 2004 Joint Conference 10th Brazilian Symposium on Multimedia and the Web 2nd Latin American Web Congress, IEEE, 204, pp. 70-77.

Schiefer, et al., "Real-time Workflow Audit Data Integration into Data Warehouse Systems", Real-time Workflow Audit Data Integration into Data Warehouse Systems, 2009, pp. 1-14.

Bonifati, et al., "Warehousing Workflow Data: Challenges and Opportunities", ISBN:1-55860-804-4, Proceedings of the 27th VLDB Conference, 2001, pp. 649-652.

* cited by examiner

AUTOMATICALLY OPTIMIZE PERFORMANCE OF PACKAGE EXECUTION

BACKGROUND

Control flows used in extract-transform-load (ETL) programs are composed of tasks that are executed sequentially or in parallel. The process is often run frequently and thus maximum performance is desired. Selecting best sequence of tasks to run can significantly improve performance. The products and custom solutions currently available require user to schedule the order of task execution manually to optimize the performance. This manual process takes a considerable amount of time and the result is not always optimal because the user may not realize the best way to make optimizations. Also, task performance can change with time due to changing data amount, network performance, resources on the computer it executes, etc. Thus, the package execution performance can degrade over time unless the user intervenes to continually make optimizations.

SUMMARY

Various technologies and techniques are disclosed that automatically optimize package execution performance. An automated process can run the package several times, measure and record the task execution profile, and then use this profile to improve performance of subsequent runs of the package. The automated process includes a profiling phase and an optimizing phase. In one implementation, the profiling phase executes each task in a control flow package and measures performance metrics, such as task execution length, task memory usage, task correlation to CPU versus input/output operations, network bandwidth, and running applications.

The optimization phase optimizes subsequent executions of the package by using the performance metrics to make appropriate adjustments to the package. In one implementation, the optimization phase uses several heuristics, such as starting parallel tasks that take longer to execute sooner, not running memory intensive tasks in parallel, and not scheduling more simultaneous CPU bound tasks than there are physical processors on the computer. The profiling phase and optimizing phase are repeated over a period of time as appropriate to improve the package's performance without requiring a user to make adjustments to the tasks in the package.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
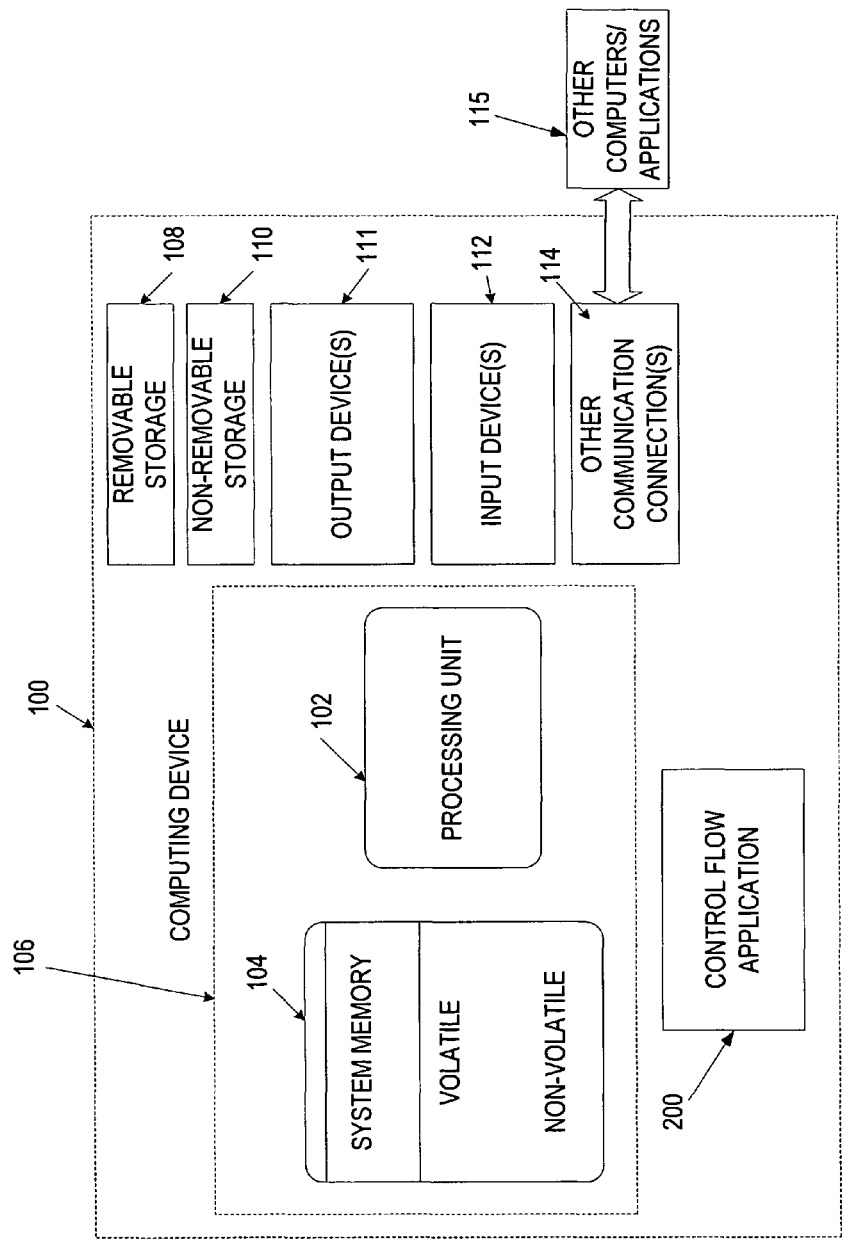
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as an application that automatically optimizes execution performance of control flow packages, but the system also serves other purposes in addition to these. In one implementation, one or more of the techniques described herein can be implemented as features within a control flow or extract-transform-load (ETL) program, or from any other type of program or service that works with multiple tasks that execute in parallel or sequentially.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers and/or applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes control flow application 200. Control flow application 200 will be described in further detail in FIG. 2.

Figure 2:
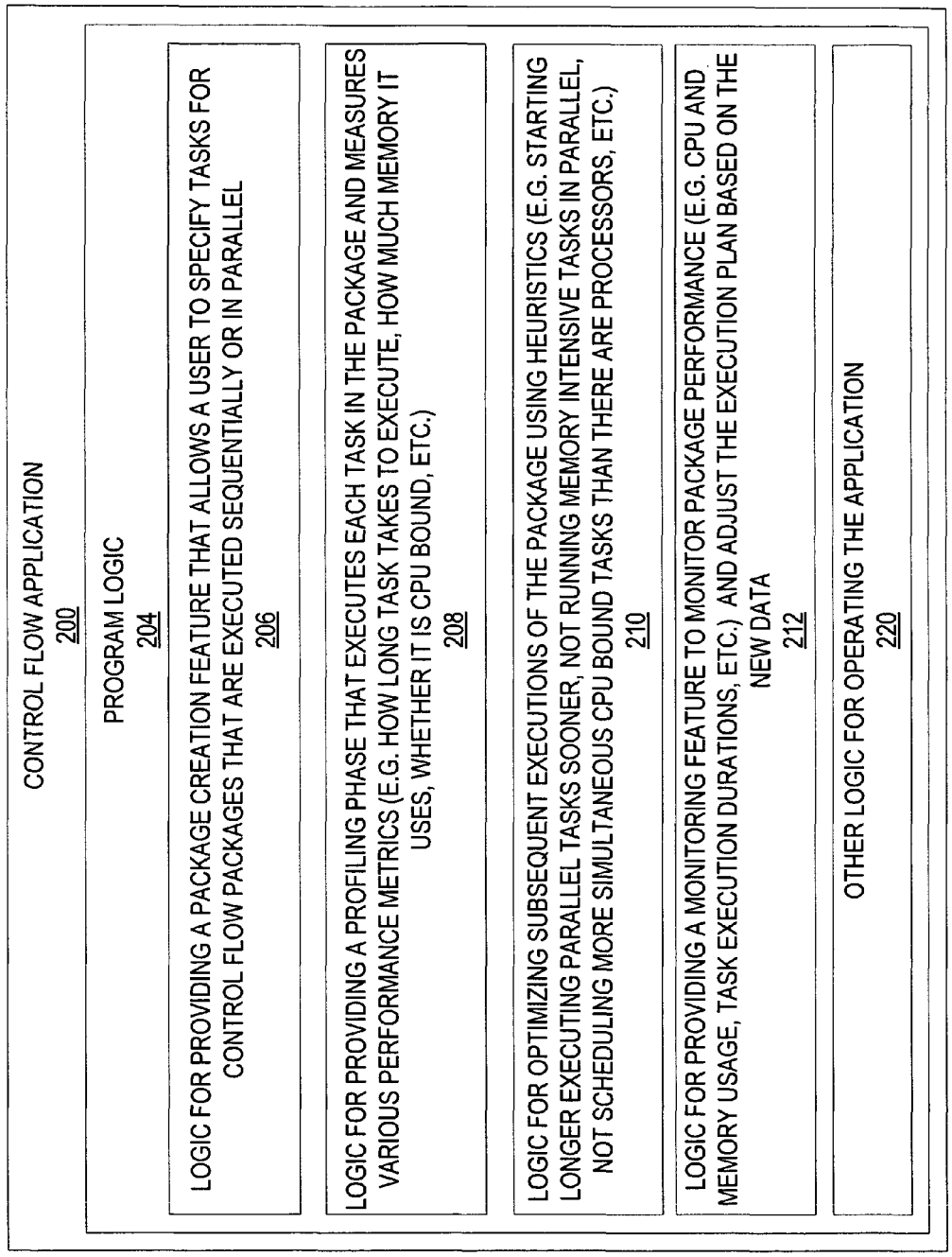
FIG. 2 is a diagrammatic view of a control flow application of one implementation operating on the computer system of FIG. 1.

Turning now to FIG. 2 with continued reference to FIG. 1, a control flow application 200 operating on computing device 100 is illustrated. In one implementation, program logic 204 resides on computing device 100. However, it will be understood that control flow application 200 can alternatively or additionally be embodied as computer-executable instructions on one or more computers and/or in different variations than shown on FIG. 1. Alternatively or additionally, one or more parts of control flow application 200 can be part of system memory 104, on other computers and/or applications 115, or other such variations as would occur to one in the computer software art.

Control flow application 200 includes program logic 204, which is responsible for carrying out some or all of the techniques described herein. Program logic 204 includes logic for providing a package creation feature that allows a user to specify tasks for control flow packages that are executed sequentially or in parallel 206; logic for providing a profiling phase that executes each task in the package and measures various performance metrics (e.g. how long a task takes to execute, how much memory it uses, whether it is CPU bound, etc.) 208; logic for optimizing subsequent executions of the package using heuristics (e.g. starting longer executable parallel tasks sooner, not running memory intensive tasks in parallel, not scheduling more CPU bound tasks than there are processors, etc.) 210; logic for providing a monitoring feature that monitors package performance (e.g. CPU and memory usage, task execution durations, etc.) and adjusts the execution plan based on the new data 212; and other logic for operating the application 220. In one implementation, program logic 204 is operable to be called programmatically from another program, such as using a single call to a procedure in program logic 204.

The examples presented herein illustrate using these technologies and techniques with a control flow/ETL application in one implementation. However, as discussed previously, in other implementations these technologies and techniques are used with other systems for executing a number of sequential and/or parallel tasks in a package.

Figure 3:
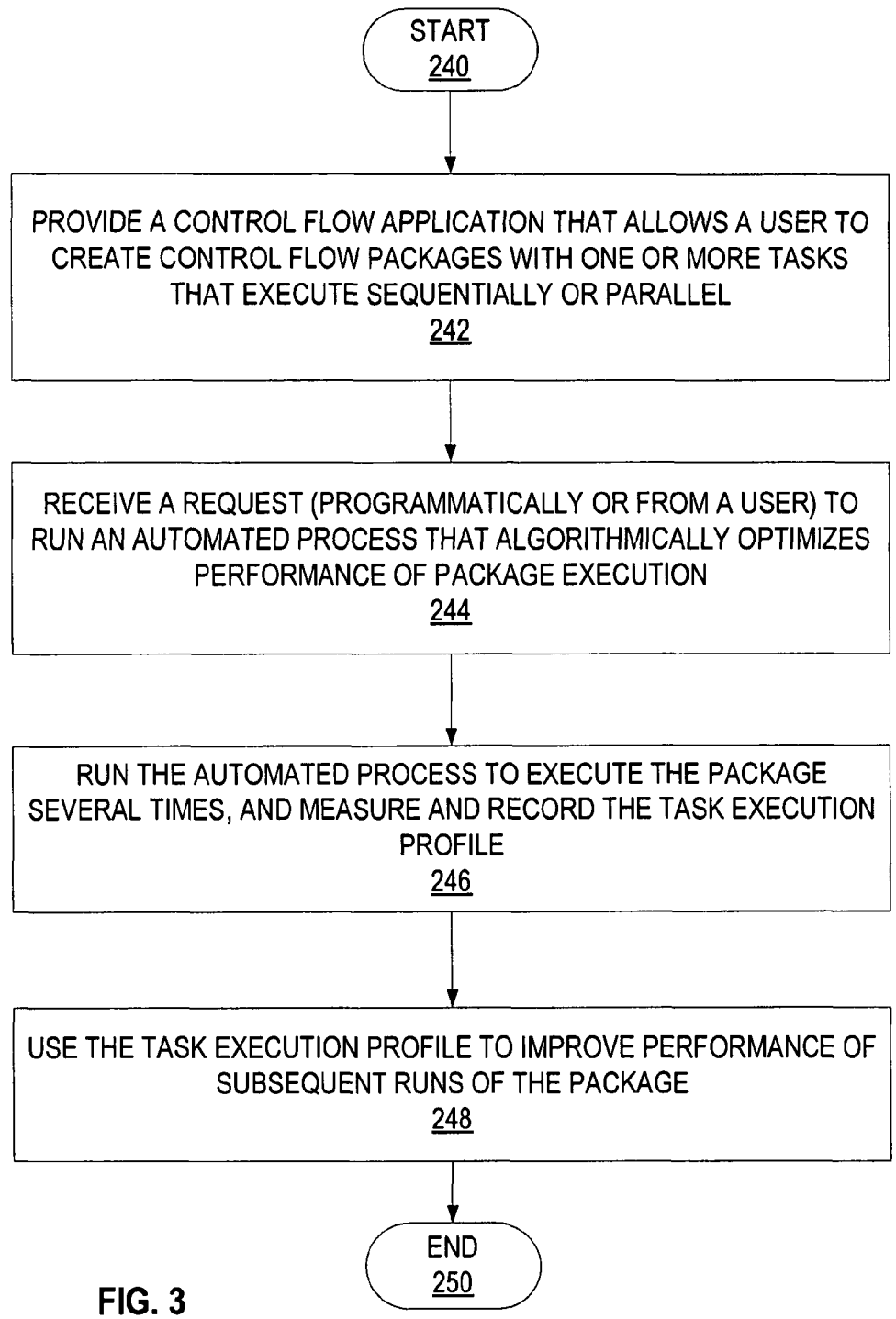
FIG. 3 is a high-level process flow diagram for one implementation of the system of FIG. 1.
Figure 4:
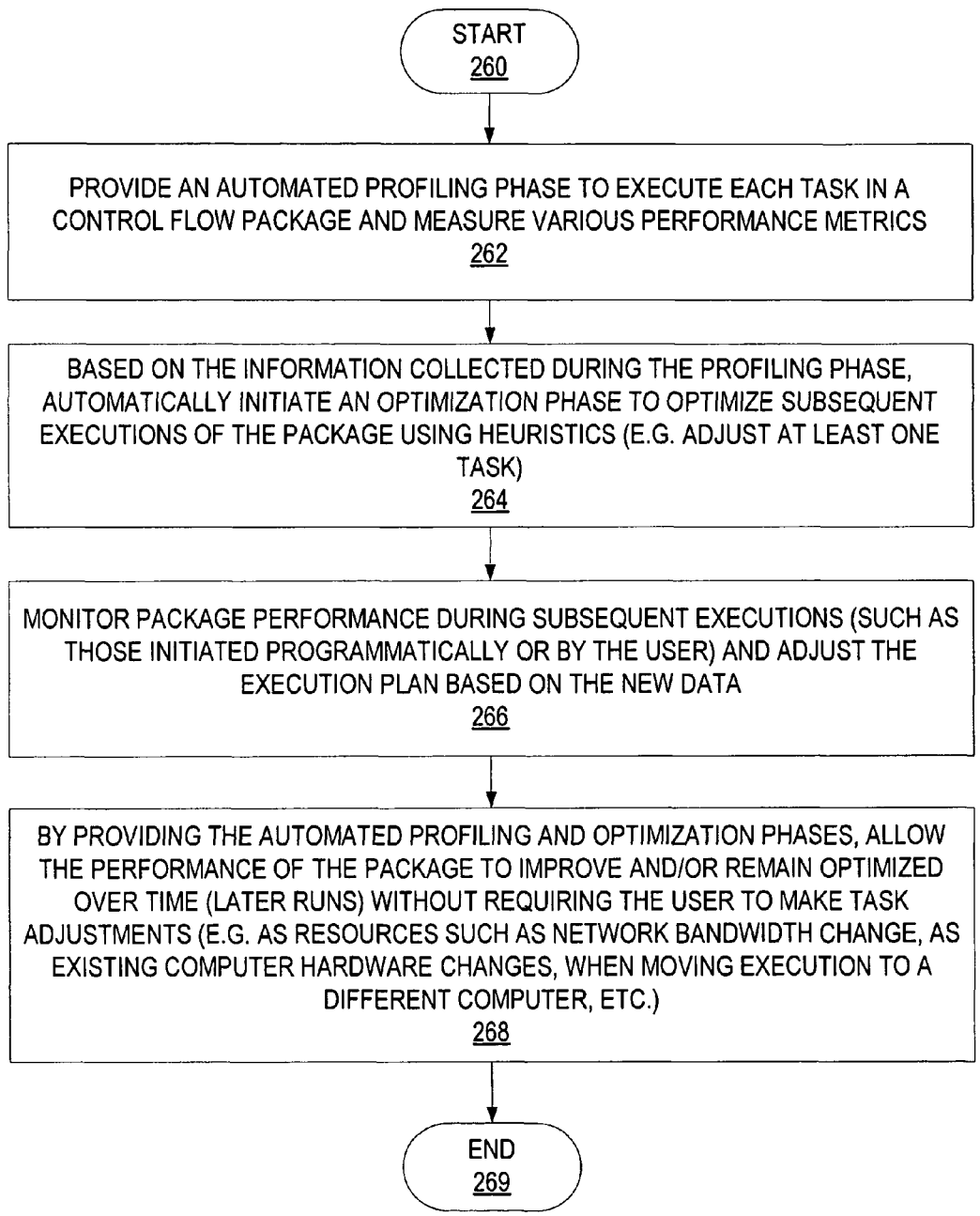
FIG. 4 is a process flow diagram for one implementation of the system of FIG. 1 illustrating the more detailed stages involved in the overall process for automatically optimizing package execution performance.

Turning now to FIGS. 3-4 with continued reference to FIGS. 1-2, the stages for implementing one or more implementations of control flow application 200 are described in further detail. FIG. 3 is a high level process flow diagram for control flow application 200. In one form, the process of FIG. 3 is at least partially implemented in the operating logic of computing device 100.

The procedure begins at start point 240 with providing a control application that allows a user to create one or more control flow packages with tasks that execute sequentially or parallel (stage 242). Control flow application 200 receives a request programmatically or from a user to run an automated process that algorithmically optimizes the performance of a package's execution (stage 244). Control flow application 200 runs the automated process to execute the package several times, to measure and record the task execution profile (stage 246). The task execution profile is used to improve performance of subsequent runs of the package (stage 248). The process ends at end point 250.

FIG. 4 illustrates one implementation of a more detailed process for automatically optimizing package execution performance. In one form, the process of FIG. 4 is at least partially implemented in the operating logic of computing device 100. The procedure begins at start point 260 with providing an automated profiling phase to execute each task in a control flow package and measure various performance metrics (stage 262). Based on the information collected during the profiling phase, control flow application 200 launches an optimization phase to automatically optimize subsequent executions of the package using heuristics (e.g. adjust at least one task) (stage 264). Control flow application 200 monitors package performance during subsequent executions (such as those initiated programmatically or by the user) and adjusts the execution plan based on the new data (stage 266).

By providing the automated profiling and optimization phases, the performance of the package is able to improve and/or remain optimized over time without requiring the user to make task adjustments to the package (stage 268). In one implementation, this allows the package to be automatically optimized after being moved to a different computer or after hardware or other upgrades to the existing computer without requiring the user to make task adjustments (stage 268). In another implementation, the package is automatically optimized based on frequently changing resources, such as network bandwidth, etc. (stage 268). The process ends at end point 269.

Figure 5:
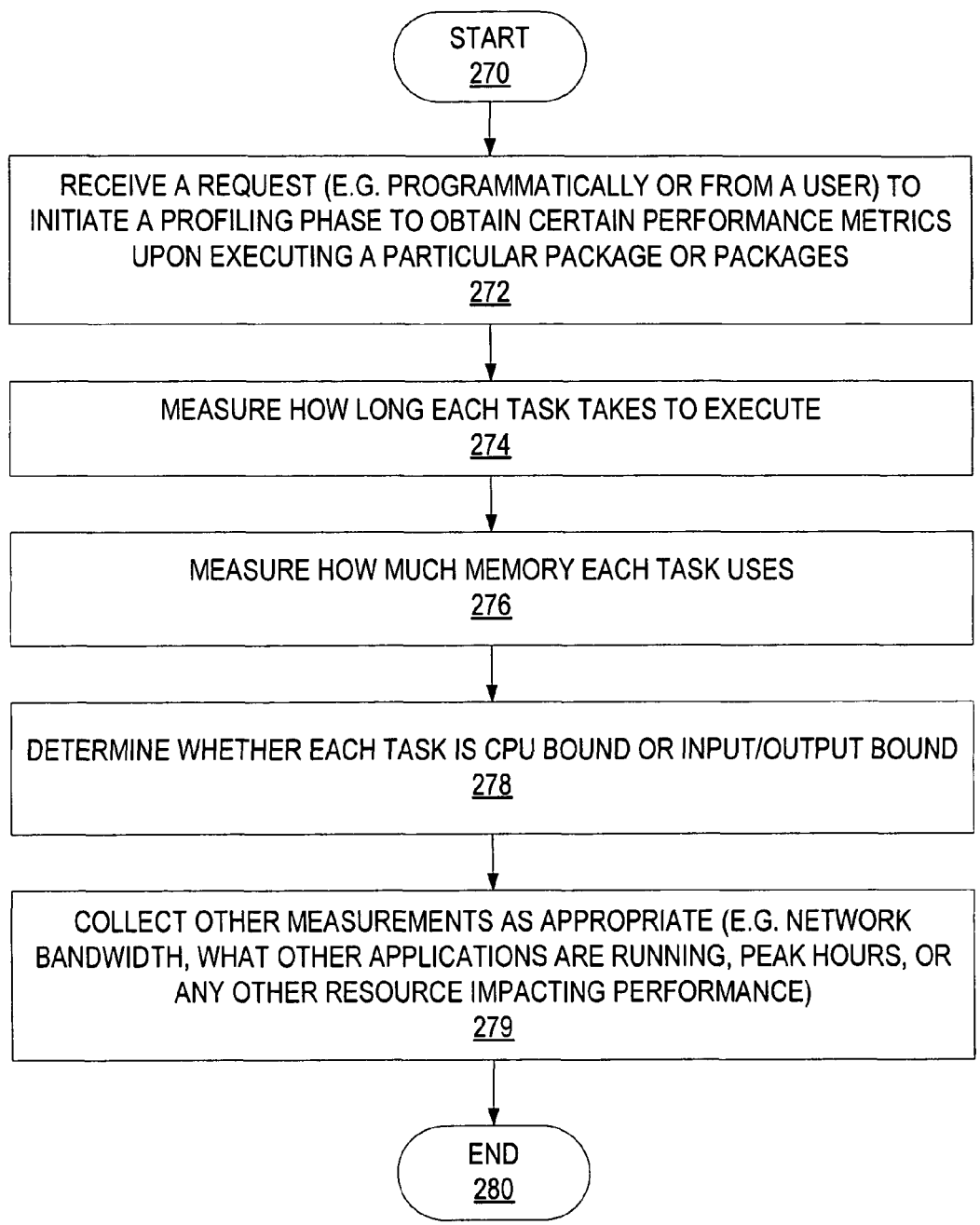
FIG. 5 is a process flow diagram for one implementation of the system of FIG. 1 illustrating the stages involved in a profiling phase.

FIG. 5 illustrates the stages involved in one implementation of a profiling process used to gather package execution data. In one form, the process of FIG. 5 is at least partially implemented in the operating logic of computing device 100. The procedure begins at start point 270 with receiving a request (e.g. programmatically or from a user) to initiate a profiling phase to obtain certain performance metrics upon executing a particular package or packages (stage 272). Control flow application 200 measures how long each task takes to execute (stage 274) and how much memory each task uses (stage 276). In one implementation, the measurement is performed using isolated task execution, so other tasks are not impacted. Control flow application 200 determines whether each task is CPU bound or input/output bound (stage 278). In one implementation, a task is CPU bound if its performance is restricted by the CPU, and a task is input/output bound when its performance is restricted by input/output operations, such as connecting to another computer, etc. Other measurements are collected as appropriate (e.g. network bandwidth, what other applications are running, peak hours, and/or other data pertaining to other resources impacting performance (stage 279). The process ends at end point 280.

Figure 6:
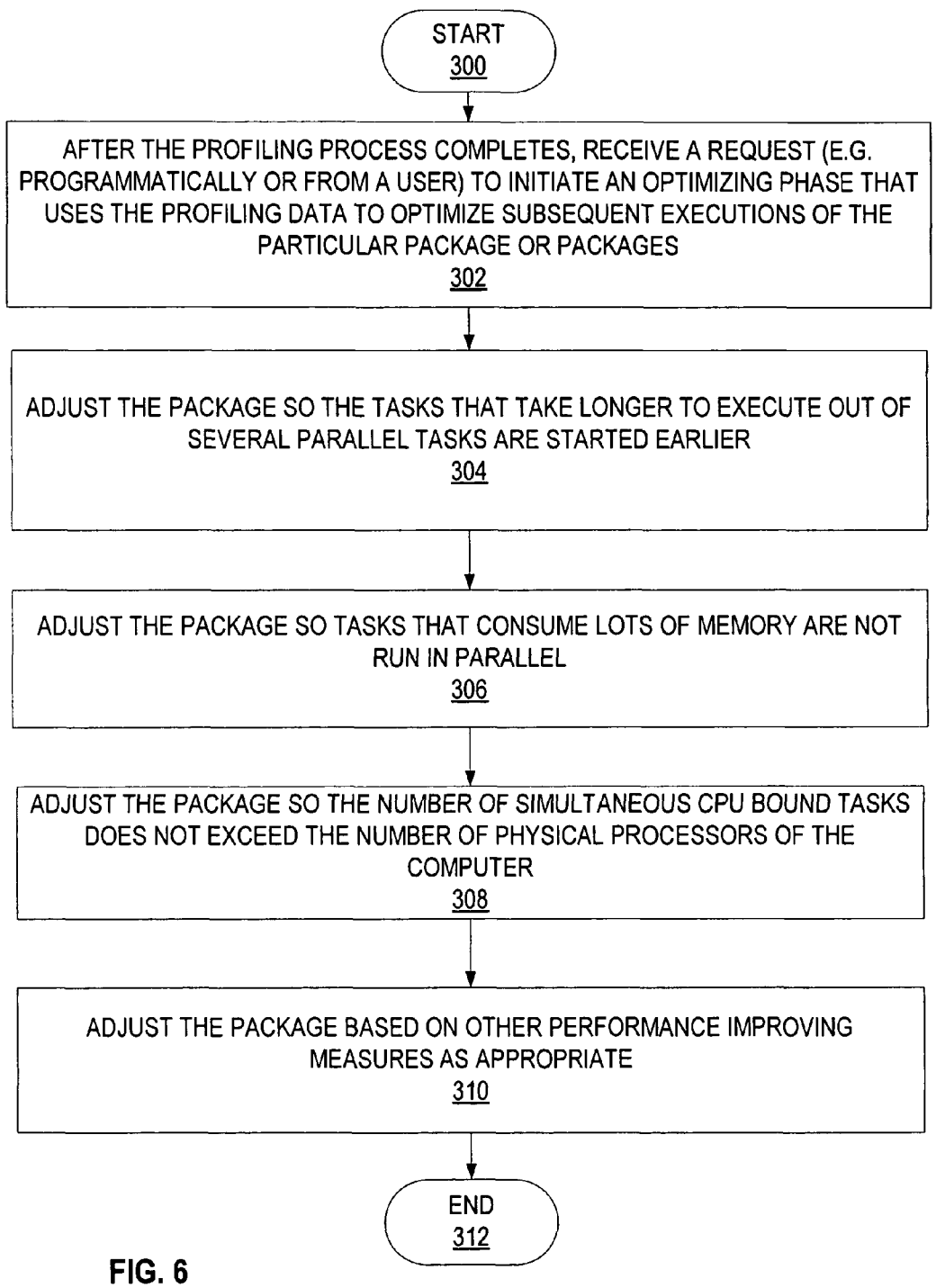
FIG. 6 is a process flow diagram for one implementation of the system of FIG. 1 illustrating the stages involved in an automatic optimization phase.

FIG. 6 illustrates the process for an automatic package optimization phase for one implementation in more detail. In one form, the process of FIG. 6 is at least partially implemented in the operating logic of computing device 100. The procedure begins at start point 300 after the profiling process completes, by control flow application 200 receiving a request (e.g. programmatically or from a user) to initiate an optimizing phase that uses the profiling data to optimize subsequent executions of the particular package or packages (stage 302).

Control flow application 200 adjusts the package so the tasks that take longer to execute out of several parallel tasks are started earlier (stage 304). Control flow application 200 adjusts the packages so tasks that consume lots of memory are not run in parallel (stage 306). Alternatively or additionally, control flow application 200 adjusts the package so the number of simultaneous CPU bound tasks does not exceed the number of physical processors of the computer (stage 308). Control flow application 200 adjusts the package based on other performance improving measures as appropriate (stage 310). The process ends at end point 312.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

What is claimed is:

1. A method for automatically optimizing scheduling of tasks in an extract-transform-load (ETL) package by a control flow application comprising the steps of:
the control flow application running an automated process for the ETL package to optimize scheduling of a plurality of tasks included in the ETL package, wherein each of the plurality of tasks is an ETL task operable to be executed sequentially or in parallel with the other tasks, the automated process comprising:
the control flow application running a profiling phase to execute each of the plurality of tasks in the ETL package at least one time and measure a plurality of performance metrics; and
the control flow application running an optimization phase to optimize subsequent executions of the plurality of tasks in the ETL package, wherein, while running the optimization phase, the control flow application uses at least a portion of the performance metrics to make at least one adjustment to the ETL package by adjusting execution of at least one of the plurality of tasks.

2. The method of claim 1, wherein the automated process allows performance of the ETL package to improve over a period of time without requiring a user to make adjustments to the tasks.

3. The method of claim 1, wherein the automated process is initiated programmatically.

4. The method of claim 1, wherein the automated process is initiated by a user.

5. The method of claim 1, wherein the plurality of performance metrics is selected from the group consisting of task execution length, task memory usage, task correlation to CPU versus input/output operations, network bandwidth, and running applications.

6. The method of claim 1, wherein the at least one adjustment includes adjusting the ETL package so at least one longer executing parallel task of the plurality of tasks is started earlier.

7. The method of claim 1, wherein the at least one adjustment includes adjusting the ETL package so a first task of the plurality of tasks that consumes a significant amount of memory is not run in parallel with a second task of the plurality of tasks that consumes the significant amount of memory.

8. The method of claim 1, wherein the at least one adjustment includes adjusting the ETL package so a number of simultaneous CPU bound tasks of the plurality of tasks does not exceed a quantity of physical processors present on a computer executing the ETL package.

9. A computer-readable storage medium having computer-executable instructions for causing a computer to perform the steps recited in claim 1.

10. A computer-readable storage medium having computer-executable instructions for causing a computer to perform steps comprising:
providing a control flow application operable to execute an extract-transform-load (ETL) control flow package;
providing a package creation feature that allows a user to create an ETL control flow package with a plurality of tasks;
providing an automatic performance improvement process that initiates a profiling phase and an optimization phase to optimize scheduling of one or more of the plurality of tasks in the ETL control flow package, wherein during the optimization phase the control flow application adjusts execution of at least one of the plurality of tasks of the ETL control flow package; and
providing a monitoring feature to monitor the performance of execution of the plurality of tasks in the ETL control flow package over a period of time and adjust an execution plan of the plurality of tasks in the ETL control flow package according to a set of data gathered using the monitoring feature.

11. The computer-readable storage medium of claim 10, wherein the profiling phase is operable to measure a plurality of performance metrics for the ETL control flow package.

12. The computer-readable storage medium of claim 10, wherein at least one of the plurality of performance metrics is selected from the group consisting of task execution length, task memory usage, task correlation to CPU versus input/output operations, network bandwidth, and running applications.

13. The computer-readable storage medium of claim 10, wherein the optimizing phase is operable to perform at least one adjustment to the ETL control flow package based on a set of profiling data gathered in the profiling phase.

14. The computer-readable storage medium of claim 13, wherein the at least one adjustment includes adjusting the ETL control flow package so at least one longer executing parallel task of the plurality of tasks is started earlier.

15. The computer-readable storage medium of claim 13, wherein the at least one adjustment includes adjusting the ETL control flow package so a first task of the plurality of tasks that consumes a significant amount of memory is not run in parallel with a second task of the plurality of tasks that consumes the significant amount of memory.

16. The computer-readable storage medium of claim 13, wherein the at least one adjustment includes adjusting the ETL control flow package so a number of simultaneous CPU bound tasks of the plurality of tasks does not exceed a quantity of physical processors present on a computer executing the ETL control flow package.

17. The computer-readable storage medium of claim 10, wherein each task of the plurality of tasks is selected from the group consisting of a sequential task and a parallel task.

18. A method for automatically optimizing package execution performance comprising the steps of:
a control flow application running a profiling phase to execute each of a plurality of tasks in an extract-transform-load (ETL) package at least one time and measure a plurality of performance metrics, wherein at least one of the plurality of performance metrics is selected from the group consisting of task execution length, task memory usage, task correlation to CPU versus input/output operations, network bandwidth, and running applications;
the control flow application running an optimization phase to optimize subsequent executions of the ETL package, wherein, while running the optimization phase, the control flow application uses at least a portion of the performance metrics to make at least one adjustment to the ETL package by adjusting execution of at least one of the plurality of tasks; and
wherein the profiling phase and optimizing phase are repeated over a period of time to improve a performance of the ETL package without requiring a user to make adjustments to execution of the tasks in the ETL package.

19. The method of claim 18, wherein the profiling phase and the optimizing phase run a first time on a first computer to improve the performance of the ETL package for the first computer, and wherein the profiling phase and the optimizing phase run a second time on a second computer to improve the performance of the ETL package for the second computer.

20. A computer-readable storage medium having computer-executable instructions for causing a computer to perform the steps recited in claim 18.

* * * * *